(12) United States Patent
Johnston et al.

(10) Patent No.: US 9,422,693 B2
(45) Date of Patent: Aug. 23, 2016

(54) PROTECTIVE DEVICE FOR A CULVERT PIPE

(71) Applicant: Westman Steel Industries, Edmonton (CA)

(72) Inventors: Jason Johnston, Edmonton (CA); Edward Gautreau, Edmonton (CA)

(73) Assignee: WESTMAN STEEL INDUSTRIES, Edmonton, Alberta (CA)

( * ) Notice: Subject to any disclaimer, the term of this patent is extended or adjusted under 35 U.S.C. 154(b) by 0 days.

(21) Appl. No.: 14/504,904

(22) Filed: Oct. 2, 2014

(65) Prior Publication Data

US 2016/0097187 A1      Apr. 7, 2016

(51) Int. Cl.
| | | |
|---|---|---|
| *E01F 5/00* | (2006.01) | |
| *E03F 7/06* | (2006.01) | |
| *E03B 7/07* | (2006.01) | |
| *F16L 55/24* | (2006.01) | |

(52) U.S. Cl.
CPC .............. *E03B 7/07* (2013.01); *E01F 5/005* (2013.01); *E03F 7/06* (2013.01); *F16L 55/24* (2013.01)

(58) Field of Classification Search
CPC ..... E01F 5/005; E03F 7/06; Y10T 403/4691
USPC ........ 405/124, 125, 127; 403/167, 168, 186, 403/262
See application file for complete search history.

(56) References Cited

U.S. PATENT DOCUMENTS

| | | | | |
|---|---|---|---|---|
| 748,201 | A * | 12/1903 | Miller ................... | A01M 21/00 43/65 |
| 1,371,143 | A * | 3/1921 | Bradburn ................ | E04D 13/08 210/460 |
| 2,970,697 | A * | 2/1961 | Larson .................... | E03F 5/14 210/163 |
| 3,353,320 | A * | 11/1967 | Grasis .................... | E04H 12/10 52/693 |
| 3,472,030 | A * | 10/1969 | Rieke ...................... | E01F 5/005 405/125 |
| 3,564,783 | A * | 2/1971 | Dunne .................. | E01F 9/0113 248/219.1 |
| 3,946,532 | A * | 3/1976 | Gilb ....................... | E04C 3/292 411/477 |
| 4,094,116 | A * | 6/1978 | Gilb ....................... | E04C 3/292 403/217 |
| 4,538,375 | A * | 9/1985 | Kelley ................... | A01M 23/08 43/60 |
| 4,658,449 | A * | 4/1987 | Martin .................. | E04H 4/1236 210/162 |
| 5,090,152 | A * | 2/1992 | Ling ....................... | E03F 7/06 137/849 |
| 5,102,537 | A | 4/1992 | Jones | |
| 5,581,934 | A * | 12/1996 | Arnold, Sr. ............... | E03F 7/06 210/162 |
| 6,447,206 | B1 | 9/2002 | Fleury | |
| 7,441,989 | B2 | 10/2008 | Fleming | |
| 2001/0050482 | A1* | 12/2001 | Phillips ................. | F16L 23/032 285/415 |
| 2009/0279954 | A1* | 11/2009 | Griffith .................... | E03F 1/00 405/125 |

* cited by examiner

*Primary Examiner* — Frederick L Lagman
(74) *Attorney, Agent, or Firm* — Ryan W. Dupuis; Kyle R. Satterthwaite; Ade & Company Inc.

(57) ABSTRACT

A protective device for a culvert pipe has a generally conical screen portion extending between a base member at one end and an apex member at the other end. The base member is annular about an opening sized to receive the open end of the culvert pipe therein. The apex member may take the form of a domed cap, or an annular ring structure. The screen portion is formed of a plurality of rigid members between opposing first and second ends which are arranged to be selectively mounted to the base member and the apex member respectively using threaded fasteners. The two apex members may thus be interchangeable with one another.

17 Claims, 8 Drawing Sheets

PROTECTIVE DEVICE FOR A CULVERT PIPE

FIELD OF THE INVENTION

The present invention relates to a protective device having a generally conical screen portion for being supported on the open end of a culvert pipe to protect the culvert pipe from debris entering the culvert pipe, including the prevention of beavers building a dam to block the flow of water through the culvert pipe, and more particularly relates to a protective device in which the generally conical screen portion is modular in construction so as to permit ready assembly and disassembly thereof. The present invention further relates to a protective device having a generally conical screen portion together with an enclosed cap portion at the apex of the generally conical screen portion.

BACKGROUND

Culvert pipes are commonly used to direct the flow of water beneath roads, for example to accommodate the drainage and dissipation of rainwater. When culvert pipes are blocked by debris, the resulting restriction to the flow of water through the drainage pipe can result in flooding. One particularly problematic source of blockage is the formation of damns by beavers which are well known to construct damns across the open end of culvert pipes to back up water flow and create a pond.

Culverts are also known to be a source of danger to children in that strong currents resulting from the dissipation of rainwater and floodwaters and the like can draw children into a culvert where they can become trapped.

In view of flooding and general safety concerns, various protective devices have been contemplated to limit access to the open ends of culvert pipes which minimizes blockage of the culvert pipe by large debris carried to the culvert pipe by the flow of water. Some examples are disclosed in U.S. Pat. Nos. 7,441,989 by Fleming, 6,447,206 by Fleury, and 5,102,537 by Jones. In each instance, a generally conical screen structure is mounted on the open end of the culvert pipe to restrict access by beavers. Due to the large diameter of many drainage culvert pipes, the resulting size of the conical screen can be very large and cumbersome to transport and deliver to an installation site. Furthermore, known conical screens are typically provided with an annular ring structure at the apex end thereof, but debris can become readily lodged in the open ring structure in some instances. The open ring structure at the apex may also result in children being trapped therein under force of drainage water currents.

SUMMARY OF THE INVENTION

According to one aspect of the present invention there is provided a protective device for use with a culvert pipe having an open end, the device comprising:

a screen portion which is generally conical about a longitudinal axis that extends between opposing first and second ends of the screen portion;

a base member supported at the first end of the screen portion in which the base member is generally annular in shape about a base opening therein and in which the base opening is sized to receive the open end of the culvert pipe therein; and an apex member supported at the second end of the screen portion;

the screen portion comprising a plurality of rigid members spanning generally longitudinally between respective first ends mounted on the base member and respective second ends mounted on the apex member; and the apex member comprising an annular rim portion mounting the rigid members of the screen portion thereon and a cap portion fully spanning across and enclosing the rim portion.

The enclosed cap portion of the apex member prevents debris from becoming lodged at the apex of the generally conical screen portion. Debris is therefore less likely to cause the further accumulation of other debris in a manner which may cause excessive blockage of the culvert pipe. The cap also reduces the size of any openings into which a child may become trapped under force of a current of drainage flow.

According to another aspect of the invention there is provided a protective device for use with a culvert pipe having an open end, the device comprising:

a screen portion which is generally conical about a longitudinal axis that extends between opposing first and second ends of the screen portion;

a base member supported at the first end of the screen portion in which the base member is generally annular in shape about a base opening therein and in which the base opening is sized to receive the open end of the culvert pipe therein; and an apex member supported at the second end of the screen portion;

the screen portion comprising a plurality of rigid members spanning generally longitudinally between respective first and second ends which are arranged to be selectively mounted to the base member and the apex member respectively so as to be readily releasable therefrom.

The selective mounting of the rigid members of the screen portion provides a modular construction which can be readily assembled by end users and disassembly if required for storage or transport. The modular arrangement of parts can be packaged efficiently and compactly to reduce inventory space requirements and shipping costs when delivering to the customer to reduce the overall cost of the device to the end user.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
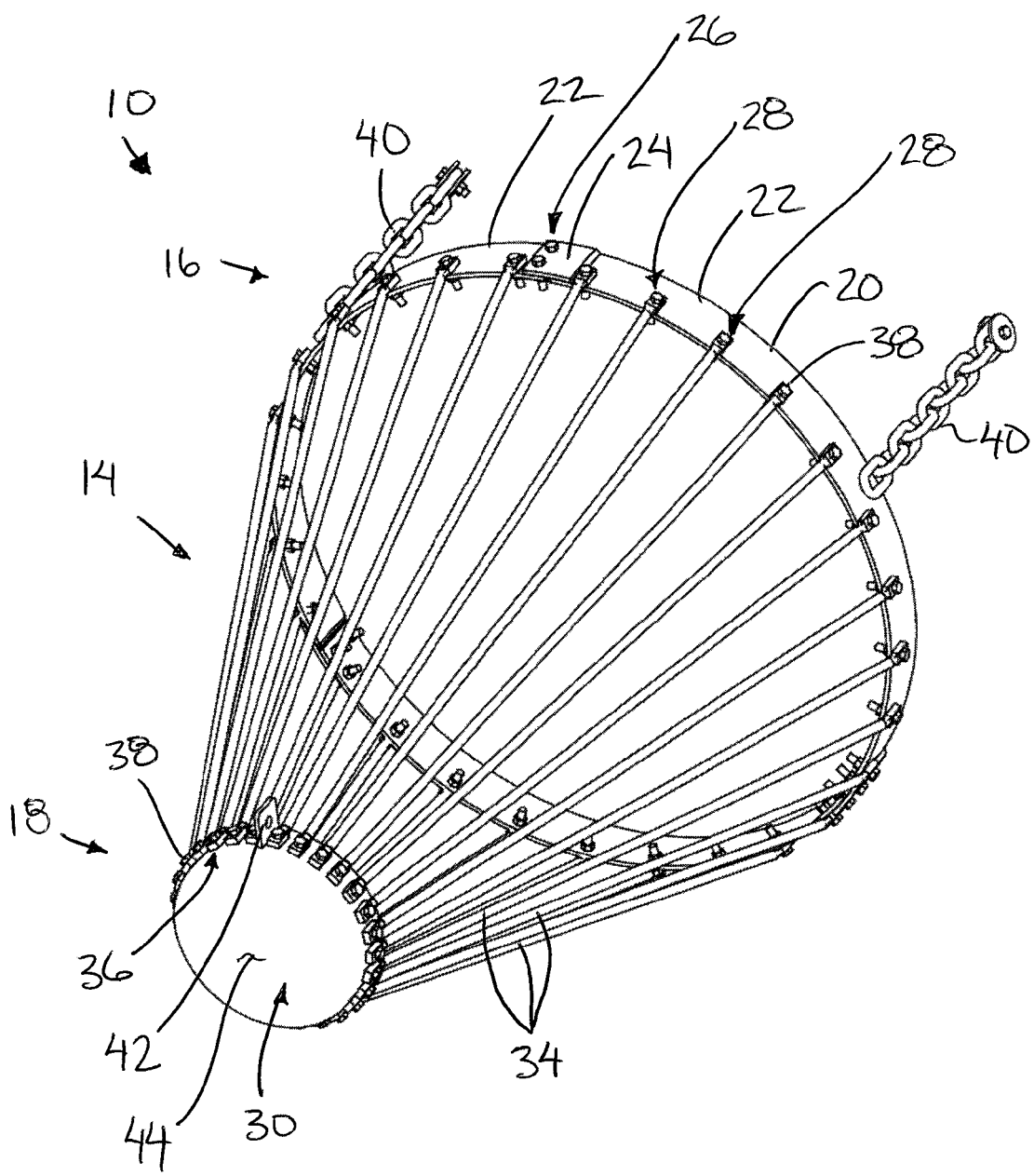
FIG. 1 is a perspective view of a first embodiment of the culvert protective device.
Figure 2:
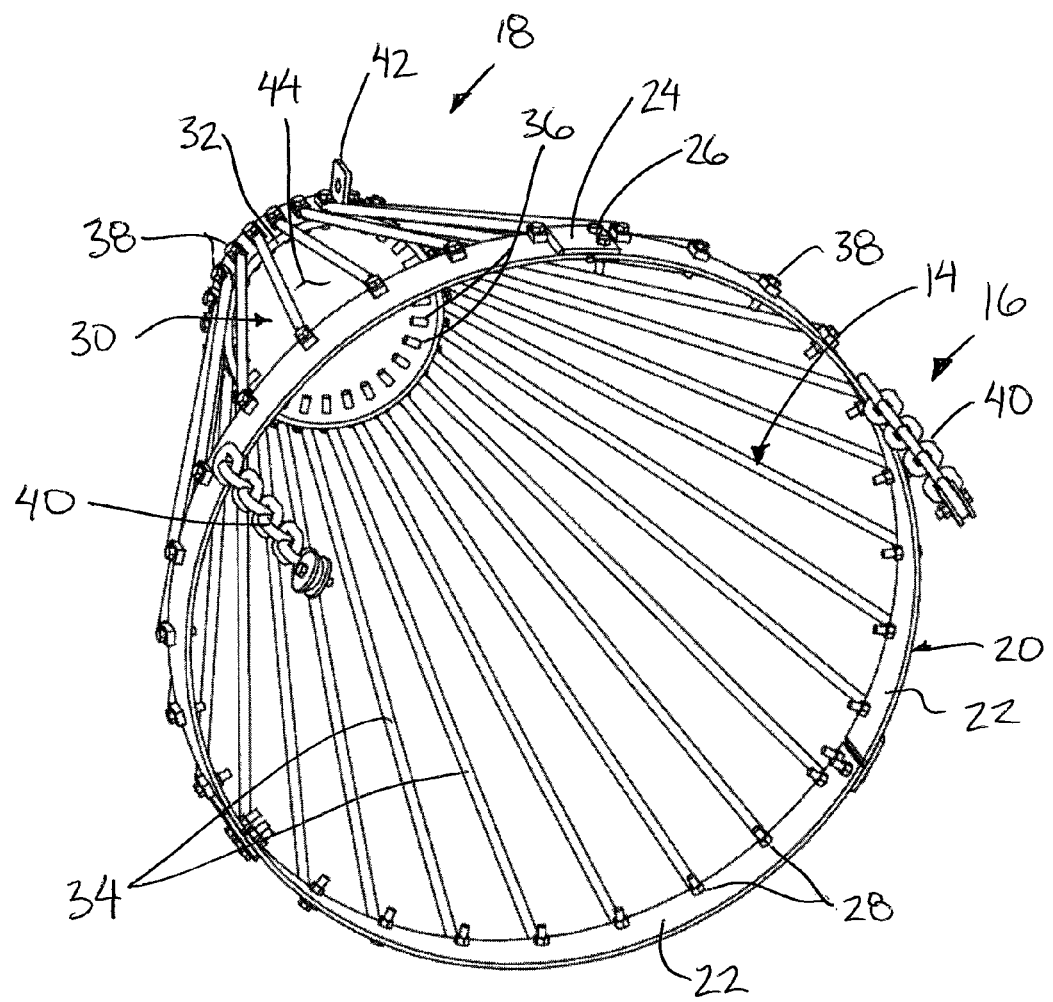
FIG. 2 is an alternative perspective view of the culvert protective device according to the first embodiment of FIG. 1.
Figure 3:
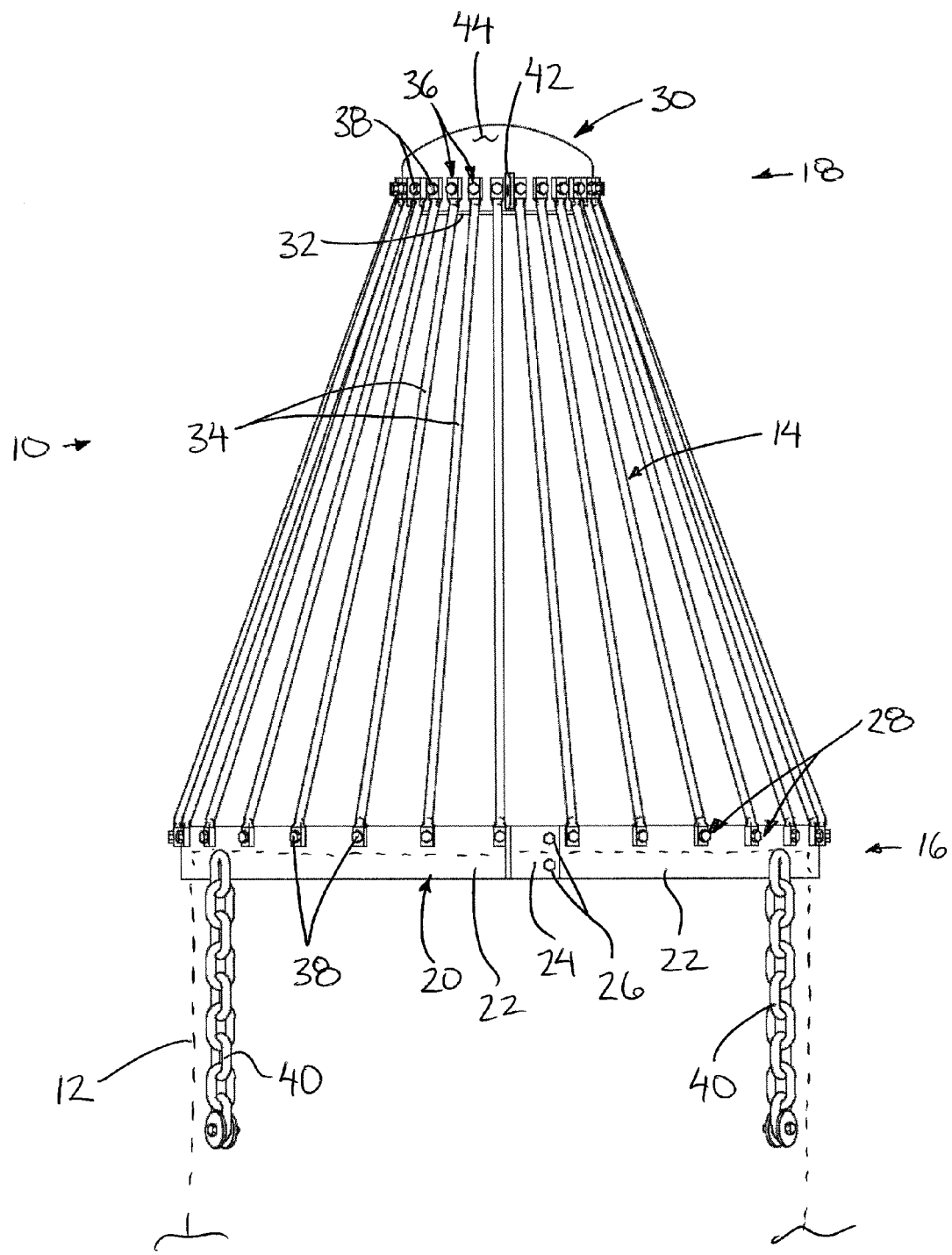
FIG. 3 is a top plan view of the culvert protective device according to the first embodiment of FIG. 1.
Figure 4:
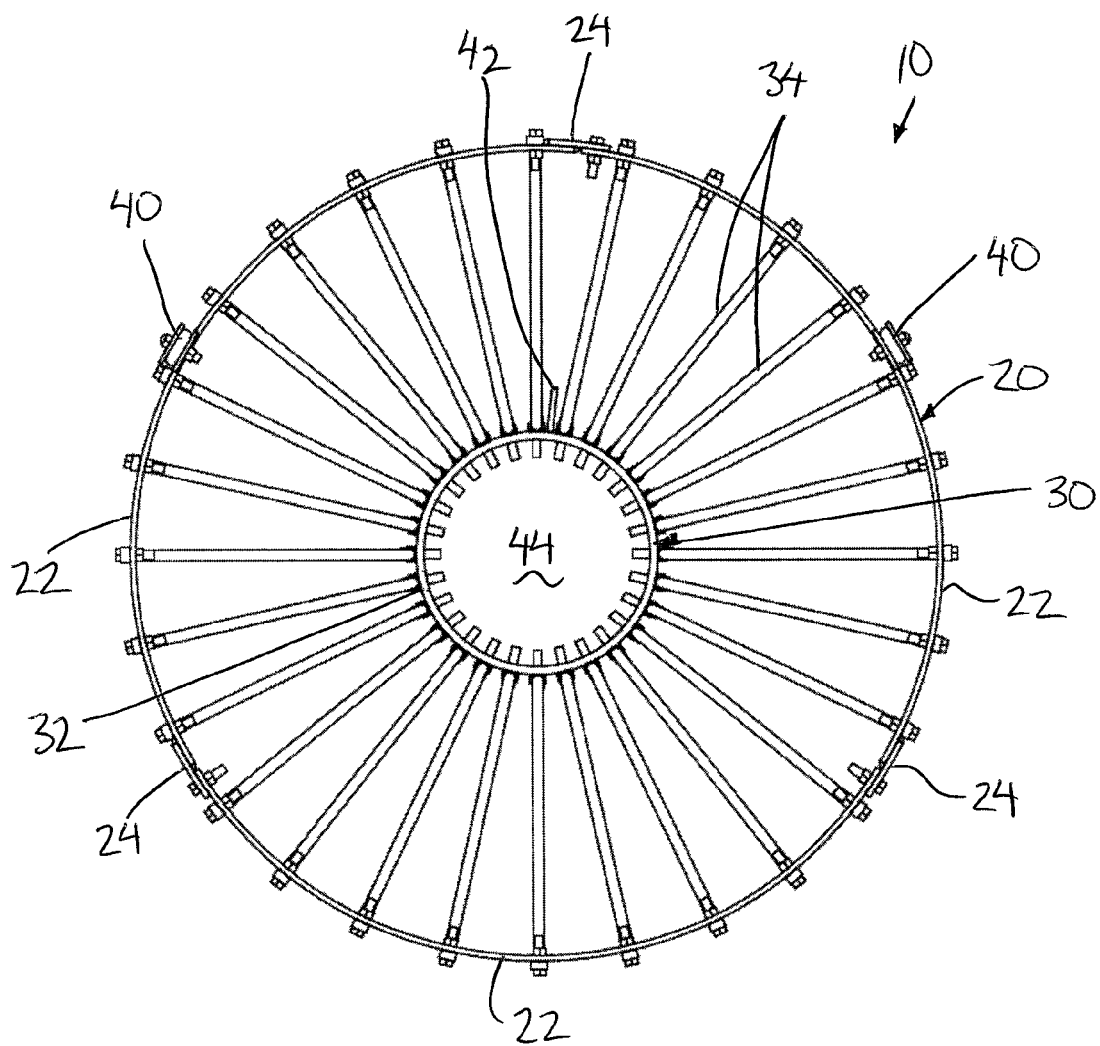
FIG. 4 is an end elevational view of the culvert protective device according to the first embodiment of FIG. 1.
Figure 5:
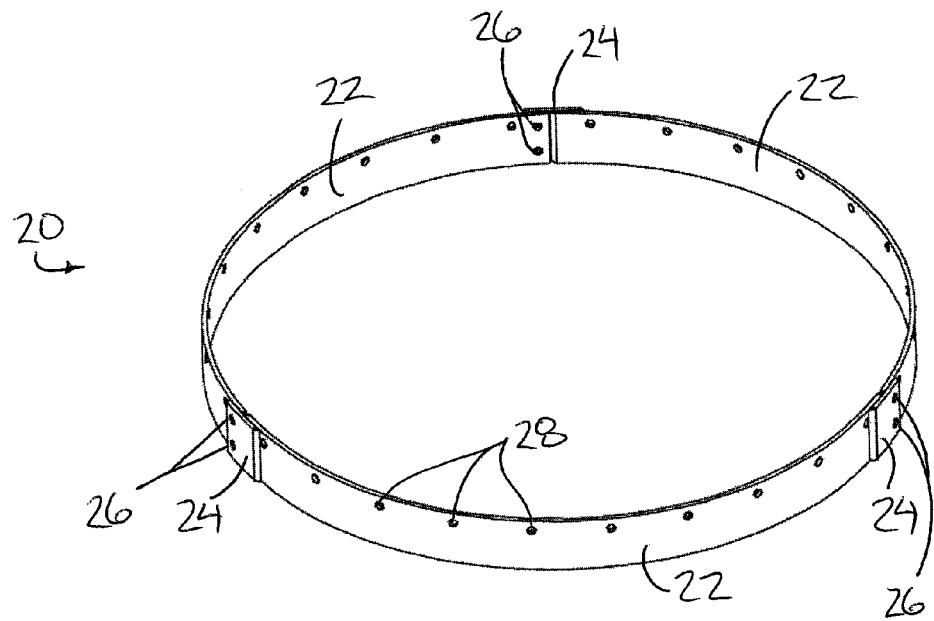
FIG. 5 is a perspective view of the assembled base member of the culvert protective device according to the first embodiment of FIG. 1.
Figure 6:
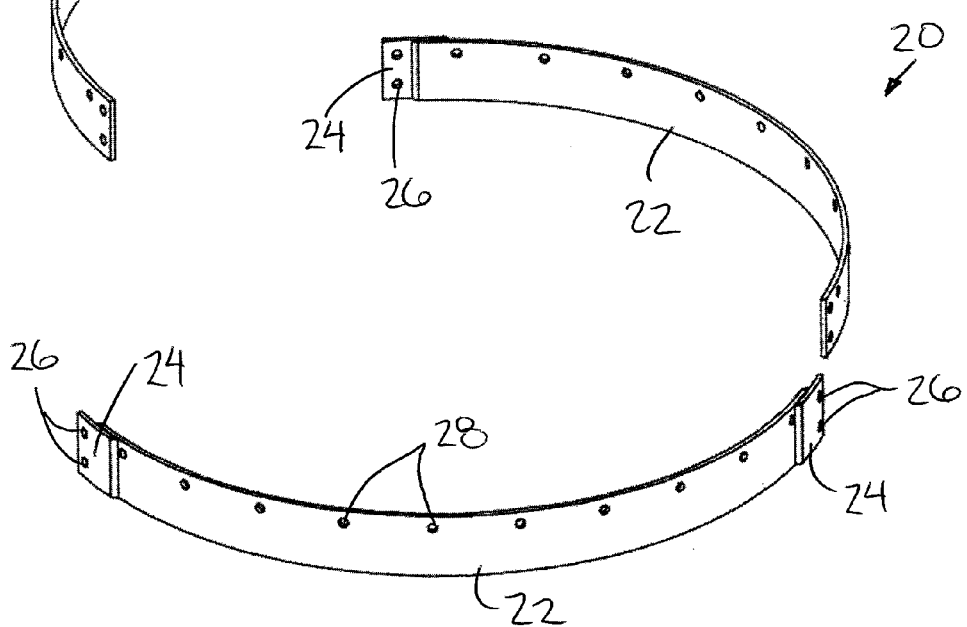
FIG. 6 is an exploded perspective view of the base member of the culvert protective device according to the first embodiment of FIG. 1.

Referring to the accompanying figures, there is illustrated a culvert protective device generally indicated by reference numeral 10. The device 10 is particularly suited for use with a culvert pipe 12, for example a large diameter circular pipe of the type used to direct flows of water under roadways and the like. The culvert pipe 12 is typically situated such that one or both ends of the pipe terminates at an open end where a circular edge of the pipe lies generally in a plane perpendicular to a longitudinal direction of the pipe.

Although various embodiments of the device 10 are shown in the accompanying figures, the common features of the various embodiments will first be described.

The device generally includes a screen portion 14 which is generally conical in shape about a longitudinal axis extending between a first end 16 and an opposing second end 18 of the screen portion which are situated at respective first and second ends of the protective device 10. More particularly, the screen portion is frusto-conical between a first end which is circular and has a large diameter, and the opposing second end which is also circular but has a smaller diameter than the first end.

The device further includes a base member 20 supported at the first end of the screen portion 14. The base member 20 generally is in the form of an annular collar assembled from three separate arcuate sections 22. Once assembled, the arcuate sections form a generally cylindrical collar which is concentric with the longitudinal axis of the screen portion.

In the illustrated embodiment, each of the three arcuate sections 22 spans approximately an arc of 120 degrees between opposing ends thereof, though different arc lengths may be used in other embodiments if desired. The opposing ends are abutted with one another in series in the assembled configuration.

Each of the three arcuate sections 22 is unique in configuration as compared to the other sections such that the arcuate sections can only be assembled in one working configuration. More specifically, the arcuate sections are abutted such that at the junction of each adjacent pair of arcuate sections, one of the sections includes a mounting flange 24 integrally formed thereon for fastened connection to the other section. More particularly, one of the arcuate sections includes integral mounting flanges 24 at both ends thereof, one of the arcuate sections includes a mounting flange at only one end thereof, and the third arcuate section includes no mounting flanges thereon.

Each mounting flange 24 overlaps the outer side of the respective arcuate section in a welded lap joint such that a portion of the mounting flange projects in the circumferential direction beyond the end of the respective arcuate section upon which it is integrally supported. The free end of the mounting flange is thus suited to overlap the adjacent arcuate section at the outer side thereof in a lap joint configuration when the sections are assembled with one another.

Fastener apertures 26 are provided in the mounting flanges 24 and at the ends of the arcuate sections not locating a mounting flange integrally thereon to permit adjacent arcuate sections to be assembled to one another using threaded fasteners. More particularly bolts are used in which the heads of the bolts are abutted at the exterior side of the mounting flange to project radially inward through the overlapping mounting flange and corresponding arcuate section to secure a nut to the bolt at the interior side of the base member. Two axially spaced apart holes are provided within each mounting flange for alignment with corresponding holes in the corresponding arcuate section coupled thereto to provide two spaced apart fasteners coupling each adjacent pair of arcuate sections.

A plurality of screen mounting holes 28 are provided at evenly spaced apart positions in the circumferential direction about the full circumference of the assembled base member adjacent the innermost edge thereof. The mounting holes 28 serve to fasten respective components of the screen portion thereto as described in further detail below.

The device 10 further includes an apex member 30 supported at the second end of the screen portion. The apex member includes an annular rim portion 32 in the form of a collar which is generally cylindrical and concentric with the longitudinal axis of the screen portion. The collar forming the annular rim portion of the apex member is smaller in diameter than the corresponding assembled collar of the base member 20.

The screen portion 14 is generally formed of a plurality of rigid rod members 34 in which each rod member is generally straight and linear between a first end coupled to the base member and a respective second end coupled to the apex member. Each rod has a generally round cross section but the opposing first and second ends are flattened and angularly offset from the longitudinal direction of the respective rod to permit abutment against the outer side of the respective annular rim portion 32 of the apex member or the annular collar of the base member 20 respectively. The flattened ends of the rods remain parallel to the cylindrical exterior surfaces of the apex member and base member respectively while the main rod portion of each rod member tapers inwardly towards the central axis of the screen member along the length thereof from the first end to the second end in the assembled configuration.

The first ends of the rod members are all spaced apart in the circumferential direction as prescribed by the spacing of the mounting holes 28 in the base member. A similar arrangement of mounting holes 36 is provided in proximity to the innermost edge to the annular rim portion 32 of the apex member to permit fastening of the second ends of the respective rigid rod members thereto. Due to the smaller diameter and accordingly smaller circumference of the annular rim portion of the apex member relative to the base member, the second ends of the rigid rod members are substantially adjacent to one another in the circumferential direction while the main rod portions of the rod members remain generally spaced apart in the circumferential direction along the length thereof.

To fasten the rigid rod members to the apex member and base member respectively, a plurality of bolts 38 are provided in which a head of each bolt abuts the exterior of the respective end of the rigid rod member by being received through a corresponding mounting aperture in the flattened end thereof. The flattened end of the rod member is in turn abutted with a cylindrical exterior surface of the respective apex member or base member such that the threaded shaft of the bolt extends radially inward through the mounting aperture in the rod member and then through the respective mounting hole 28 or 36 in the base member or apex member respectively. A corresponding nut is fastened to each bolt 38 at the inner surface of the respective base member or apex member.

The use of bolts 38 permits the entire culvert protective device 10 to be readily disassembled and reassembled for transport or storage as may be desired. The connection of each rigid rod member 34 to both the apex member and the base member can be readily released by releasing the respective threaded fasteners while the large diameter base member can in turn be separated into three sections such that all of the components can be compactly received within a respective storage or transport container. As shown in the accompanying figures, the base member 20 includes a mounting surface thereon which is circumferentially oriented about the longitudinal axis of the screen portion and which includes a plurality of circumferentially spaced apart mounting holes 28 therein, and the apex member 30 includes a similar mounting surface thereon which is circumferentially oriented about the longitudinal axis of the screen portion and which includes a plurality of circumferentially spaced apart mounting holes 36 therein. As further shown in the figures and described above, each of the rigid members 34 of the screen portion generally includes i) a main portion which extends in a longitudinal direction between the first end and the second end of the rigid member, ii) a first end portion at the first end of the main portion which is flat and angularly offset from the longitudinal direction of the main portion so as to be mounted in parallel abutment against the mounting surface of the base member and which includes a mounting aperture therein in alignment with a respective one of the mounting holes of the base member and iii) a second end portion at the second end of the main portion which is angularly offset from the longitudinal direction of the main portion so as to be mounted in parallel abutment against the mounting surface of the apex member and which includes a mounting aperture therein in alignment with a respective one of the mounting holes of the apex member. One of the bolts 38 is received through the mounting aperture of each end portion of each rigid member and through the respective mounting hole of the apex member or base member so as to secure the end portions of the rigid members against the respective mounting surfaces of the base member and the apex member in a manner which permits the rigid members to be readily released from the base member and the apex member upon removal of the bolts.

In use, the device 10 is assembled in a configuration where the large diameter base member 20 is suitably sized such that the through opening defined therein about which the collar extends is sized to receive the open end of the culvert pipe therein. Chains 40 may be anchored to two of the arcuate sections 22 of the base member for in turn mounting to the exterior of the culvert pipe at circumferentially spaced positions in proximity to the open end thereof. The chains serve to maintain the protective device in the mounted position relative to the culvert pipe during normal use, while also permitting the protective device to be displaced upwardly away from the open end of the culvert pipe for access as may be desired. An eyelet 42 may also be fixed to the rim portion of the apex member 30 to assist in manipulating the position of the protective device relative to the culvert pipe.

Turning now more particularly to the embodiment of FIGS. 1 through 6, the apex member 30 further includes a cap portion 44 which fully spans across the exterior side of the annular rim portion 32. More particularly, the cap portion 44 fully encloses the annular rim portion 32. In the illustrated embodiment, the cap portion 44 has a convex outer surface such that the cap portion protrudes longitudinally outward while tapering inwardly towards a central apex portion which lies generally perpendicularly to the longitudinal axis of the screen portion. The enclosed cap portion with a protruding central apex portion prevents the lodging of debris at the apex to more safely direct the flow of debris to the outer circumference of the base member so as not to restrict water flow through the culvert.

Figure 7:
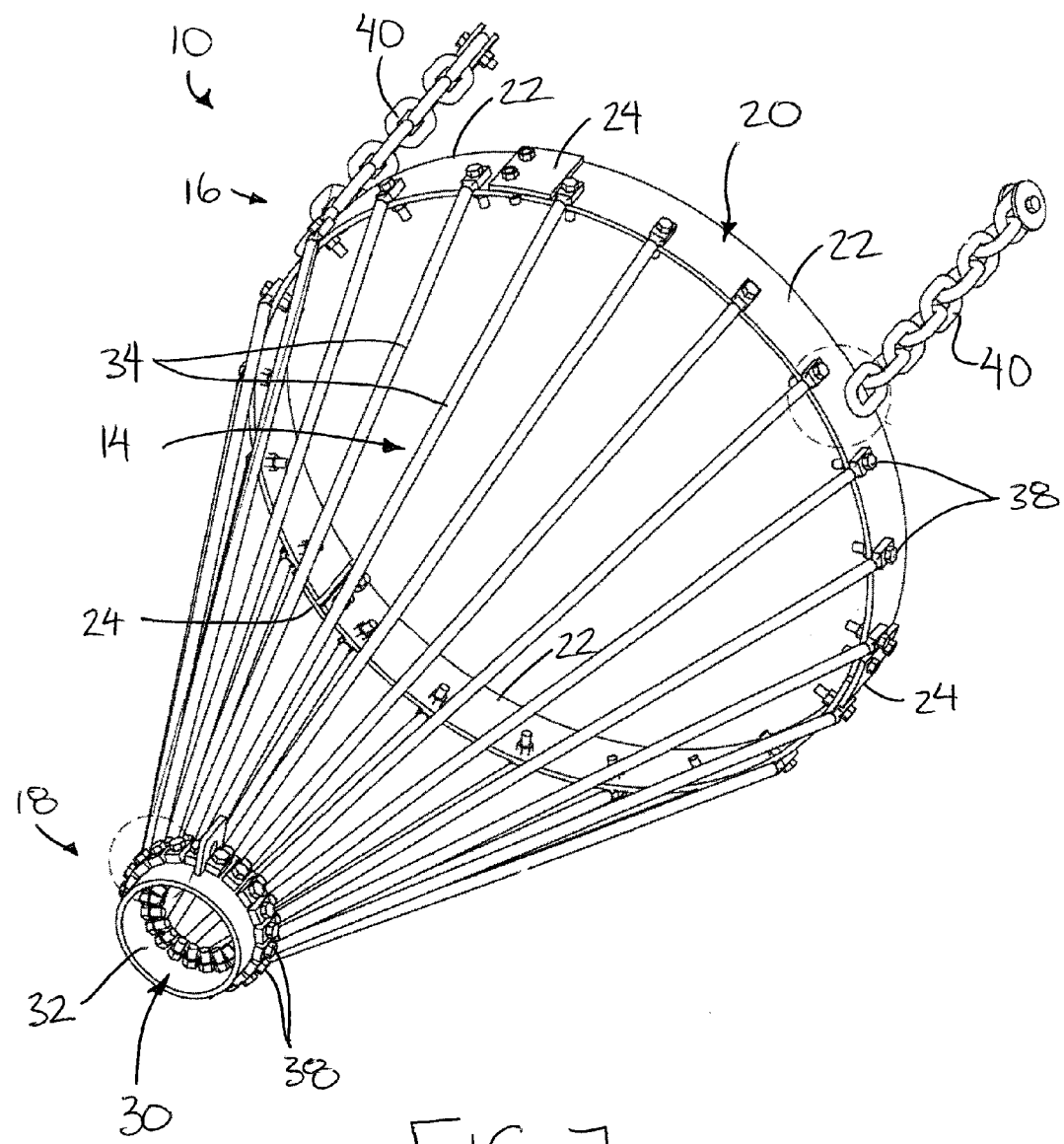
FIG. 7 is a perspective view of a second embodiment of the culvert protective device.
Figure 8:
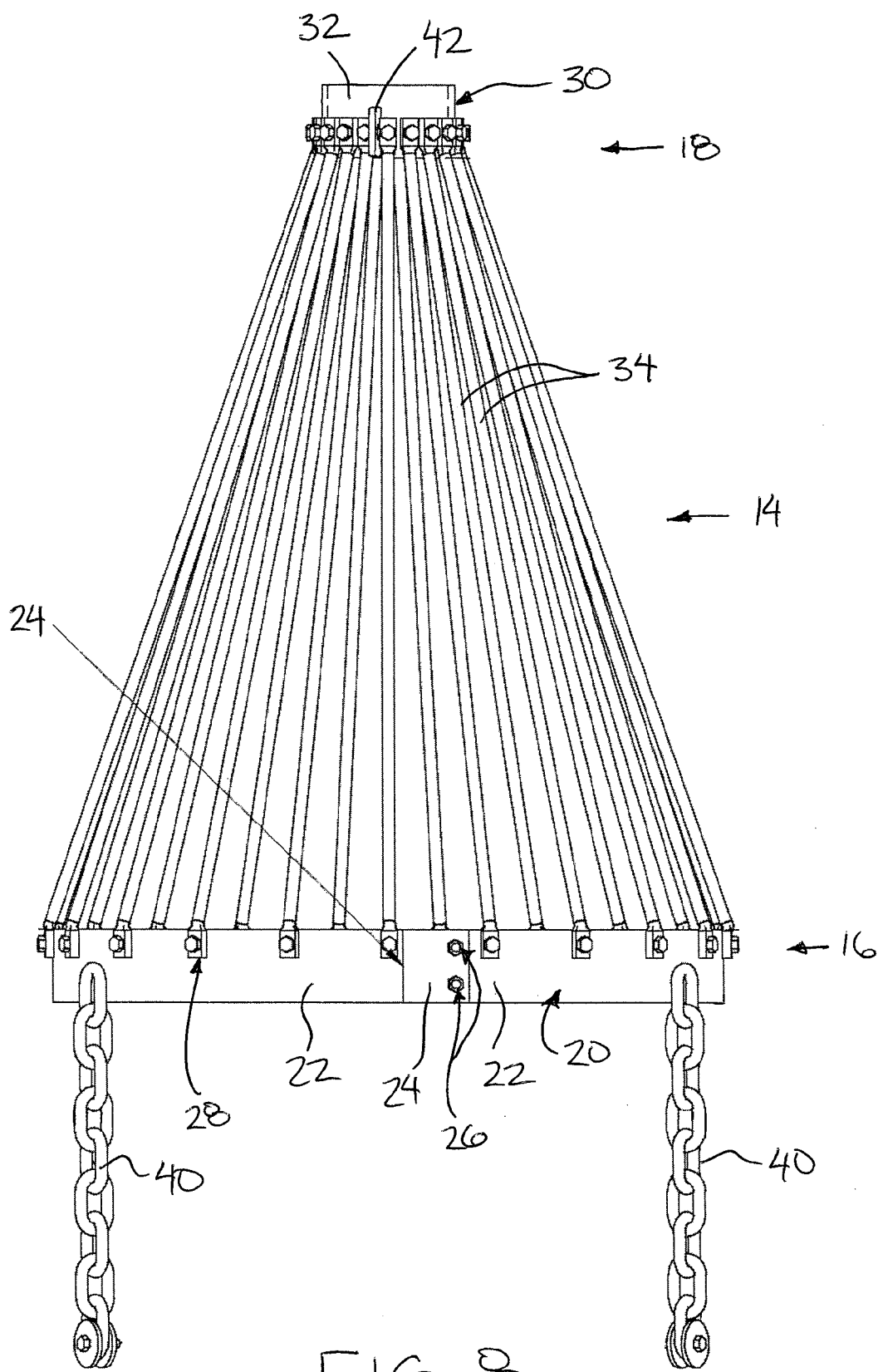
FIG. 8 is a top plan view of the culvert protective device according to the second embodiment of FIG. 7.
Figure 9:
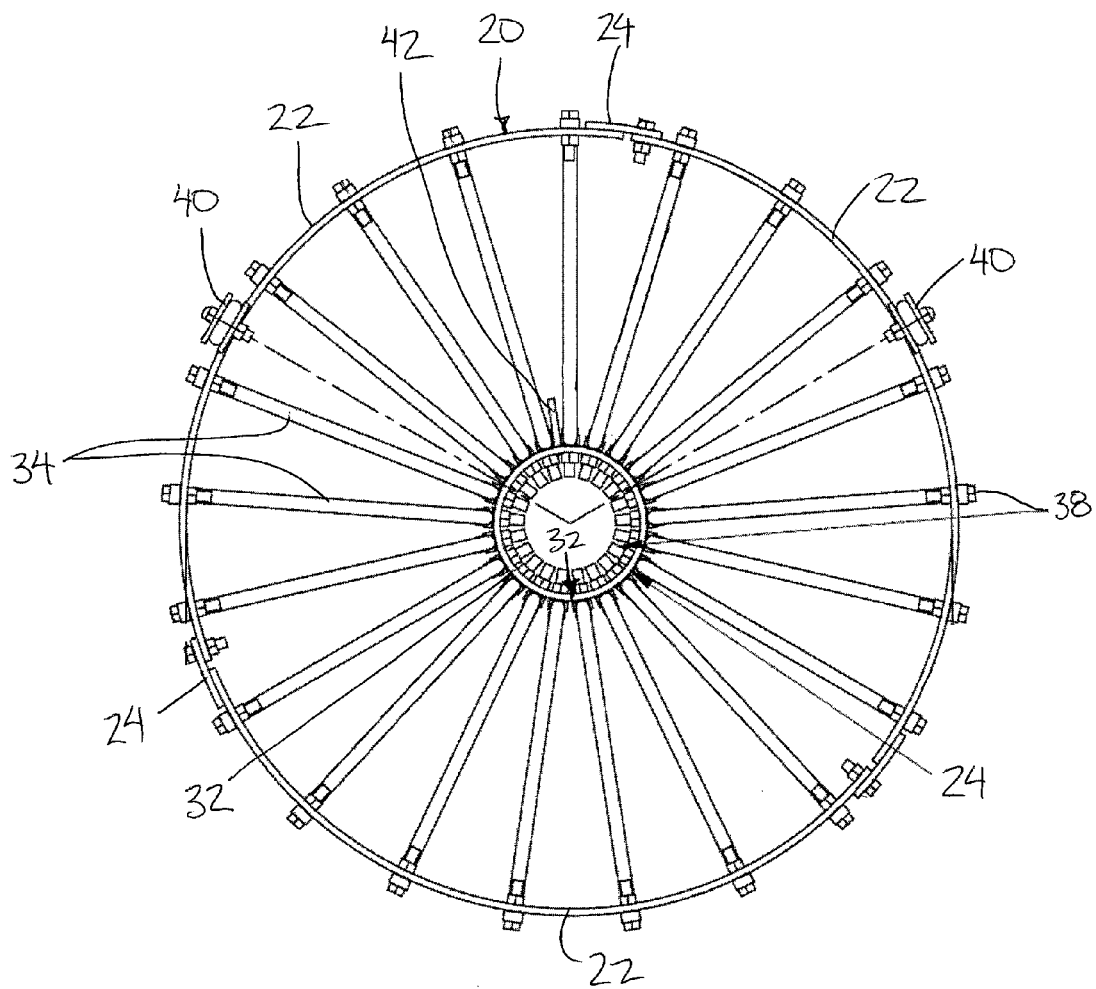
FIG. 9 is an end elevational view of the culvert protective device according to the second embodiment of FIG. 7.

Alternatively as shown in FIGS. 7 through 9, the apex member 30 may consist solely of a collar defining the annular rim portion 32. Accordingly, the apex member includes a through opening which extends fully through from the interior end to the exterior end of the apex member in the longitudinal direction of the conical screen portion 14.

The rim portion 32 of the apex member 30 according to the first and second embodiments are substantially identical to one another such that the apex member of FIG. 1 and the alternative apex member of FIG. 7 are readily interchangeable with one another as a result of the identical pattern of mounting holes 36 provided in the annular rim portion which readily permit threaded fastening of the second ends of the rigid rod members 34 thereto respectively. The through opening of the alternative apex member according to FIGS. 7 through 9 may be desirable where a greater water flow through the culvert protective device is desired.

In yet further embodiments, the mounting holes provided in the annular rim portion of the apex member and/or in the base member may be threaded bores to permit direct threaded connection of the respective bolts 38 inserted therein rather than relying on additional nuts to be secured at the inner side thereof.

Since various modifications can be made in my invention as herein above described, it is intended that all matter contained in the accompanying specification shall be interpreted as illustrative only and not in a limiting sense.

The invention claimed is:

1. A protective device for use with a culvert pipe having an open end, the device comprising:
   a screen portion which is generally conical about a longitudinal axis that extends between opposing first and second ends of the screen portion;
   a base member supported at the first end of the screen portion in which the base member is generally annular in shape about a base opening therein and in which the base opening is sized to receive the open end of the culvert pipe therein, the base member including a mounting surface thereon which is circumferentially oriented about the longitudinal axis of the screen portion and which includes a plurality of circumferentially spaced apart mounting holes therein;
   an apex member supported at the second end of the screen portion, the apex member including a mounting surface thereon which is circumferentially oriented about the longitudinal axis of the screen portion and which includes a plurality of circumferentially spaced apart mounting holes therein;
   the screen portion comprising a plurality of rigid members spanning generally longitudinally between respective first and second ends, each rigid member comprising:
     a main portion which extends in a longitudinal direction between the first end and the second end of the rigid member;
     a first end portion at the first end of the main portion which is flat and angularly offset from the longitudinal direction of the main portion so as to be mounted in parallel abutment against the mounting surface of the base member and which includes a mounting aperture therein in alignment with a respective one of the mounting holes of the base member; and a second end portion at the second end of the main portion which is flat and angularly offset from the longitudinal direction of the main portion so as to be mounted in parallel abutment against the mounting surface of the apex member and which includes a mounting aperture therein in alignment with a respective one of the mounting holes of the apex member; and a threaded fastener received through the mounting aperture of each end portion of each rigid member and through the respective mounting hole so as to secure the end portions of the rigid members against the respective mounting surfaces of the base member and the apex member in a manner which permits the rigid members to be readily released from the base member and the apex member upon removal of the threaded fasteners.

2. The device according to claim 1 wherein the mounting surface upon which the first end of each rigid member is abutted is an exterior surface of the base member.

3. The device according to claim 1 wherein the mounting surface upon which the second end of each rigid member is abutted is an exterior surface of the apex member.

4. The device according to claim 1 wherein the base member comprises at least three arcuate sections arranged to be connected in series with one another in a circumferential direction.

5. The device according to claim 4 wherein each arcuate section is uniquely configured such that the arcuate sections can only be assembled in a single configuration.

6. The device according to claim 4 wherein the arcuate sections of each adjacent pair are arranged to be coupled to one another in a lap joint configuration.

7. The device according to claim 4 wherein the arcuate sections of each adjacent pair are arranged to be releasably coupled to one another using radially oriented threaded fasteners.

8. The device according to claim 1 wherein the apex member comprises an annular rim portion which locates the mounting surface that mounts the rigid members of the screen portion thereon and a cap portion fully spanning across and enclosing the rim portion.

9. The device according to claim 8 wherein the cap portion protrude longitudinally outward from the annular rim portion to a central apex portion.

10. The device according to claim 9 wherein the central apex portion lies perpendicularly to the longitudinal axis.

11. The device according to claim 8 wherein the cap portion has a convex outer surface.

12. The device according to claim 8 further comprising an auxiliary member which has an annular rim portion which is annular in shape about a central through opening, the auxiliary member and the apex member being readily interchangeable with one another.

13. A protective device for use with a culvert pipe having an open end, the device comprising:

a screen portion which is generally conical about a longitudinal axis that extends between opposing first and second ends of the screen portion;

a base member supported at the first end of the screen portion in which the base member is generally annular in shape about a base opening therein and in which the base opening is sized to receive the open end of the culvert pipe therein; and an apex member supported at the second end of the screen portion;

the screen portion comprising a plurality of rigid members spanning generally longitudinally between respective first ends mounted on the base member and respective second ends mounted on the apex member; and the apex member comprising an annular rim portion mounting the rigid members of the screen portion thereon and a cap portion fully spanning across and enclosing the rim portion.

14. The device according to claim 13 wherein the cap portion protrude longitudinally outward from the annular rim portion to a central apex portion.

15. The device according to claim 14 wherein the central apex portion lies perpendicularly to the longitudinal axis.

16. The device according to claim 13 wherein the cap portion has a convex outer surface.

17. The device according to claim 13 further comprising an auxiliary member which has an annular rim portion which is annular in shape about a central through opening, the auxiliary member and the apex member being readily interchangeable with one another.

* * * * *